United States Patent [19]

Story et al.

[11] Patent Number: 5,090,871
[45] Date of Patent: Feb. 25, 1992

[54] JUNCTION ASSEMBLY WITH LEAK DETECTION MEANS

[75] Inventors: Carl E. Story, Cupertino; Kenneth M. O'Connor, Fremont, both of Calif.

[73] Assignee: Systems Chemistry, Inc., Milpitas, Calif.

[21] Appl. No.: 656,304

[22] Filed: Feb. 12, 1991

[51] Int. Cl.⁵ .............................................. F04B 49/06
[52] U.S. Cl. .......................................... 417/9; 417/63; 285/93; 285/352
[58] Field of Search ................ 417/9, 63; 285/93, 352, 285/351, 336

[56] References Cited

U.S. PATENT DOCUMENTS

| | | | |
|---|---|---|---|
| 2,239,270 | 4/1941 | Jahreis | 417/9 |
| 3,176,623 | 4/1965 | Howerton et al. | 417/9 |
| 3,299,417 | 1/1967 | Silthorke | 285/93 |
| 4,288,105 | 9/1981 | Press | 285/93 |
| 4,838,491 | 6/1989 | Bennett et al. | 285/351 |

Primary Examiner—Richard A. Bertsch
Assistant Examiner—David W. Scheuermann
Attorney, Agent, or Firm—Rosenblum, Parish & Bacigalupi

[57] ABSTRACT

A junction assembly with leak detection means comprising a pair of mating surfaces forming the junction of two fluid conduits, means forming an annular containment chamber in at least one of the surfaces circumscribing the conduit passageway, a pair of spaced apart O-ring seals respectively disposed on opposite sides of the containment chamber, a fluid sensor extending into the containment chamber for sensing the presence of unwanted fluids therein due to the failure of an O-ring seal and a control system for responding to an output signal generated by the sensor to deactivate the system in the event of failure.

10 Claims, 3 Drawing Sheets

JUNCTION ASSEMBLY WITH LEAK DETECTION MEANS

BACKGROUND OF THE INVENTION

1. Field of the Invention

The present invention relates generally to fluid transport apparatus and more particularly to an improved O-ring sealed, fluid conducting junction assembly having means for immediately detecting O-ring failure or leakage.

2. Brief Description of the Prior Art

In the semiconductor manufacturing industry, various corrosive, caustic and solvent materials are used and must be carefully handled to prevent damage to mechanical equipment and injury to both environment and production employees. Furthermore, processing chemicals, solvents and deionized water must be kept as pure as possible during all aspects of their handling and supply since any contact of the flow stream with a contaminant can result in defects in the manufactured product, such defects often being undetectable until after the manufacturing operation has been completed. In systems handling such fluids, any coupling or joint is susceptible of leakage or invasive contamination. To militate against such occurrences, multiple gaskets or O-ring seals are frequently used. However, even through the provision of multiple seals will normally be effective in the first instance to contain a leak resulting from failure of an inner seal, it provides no indication of the event nor does it insure that leak or invasion will not occur through an outer seal before the fact of inner seal failure is detected.

SUMMARY OF THE PRESENT INVENTION

It is therefore a principal object of the present invention to provide an improved conduit junction assembly having sealing means for preventing leakage or contamination of a transported fluid in the event of a seal failure.

Another object of the present invention is to provide an improved junction assembly of the type described having a containment chamber disposed between two O-rings and having means for detecting intrusion of a fluid into the containment chamber in the event of a seal failure.

Yet another object of the present invention is to provide a fluid transport system including an assembly of the type described having means for quickly sensing the intrusion of fluid into the containment chamber due to the failure of the primary O-ring and for immediately shutting down the system in the event that such failure is detected.

Briefly, a preferred embodiment of the present invention includes a pair of mating surfaces forming the junction of two fluid conduits, means forming an annular containment chamber in at least one of the surfaces circumscribing the conduit passageway, a pair of spaced apart O-ring seals respectively disposed on opposite sides of the containment chamber, a fluid sensor extending into the containment chamber for sensing the presence of unwanted fluids therein due to the failure of an O-ring seal. A control system responsive to an output signal generated by the sensor issued to deactivate the system in the event of a failure.

An important advantage of the present invention is that in the event of a seal failure, leakage will be immediately detected and the system will be shut down.

Another advantage of the present invention is that even in the event of a seal failure, fluid leaking through the primary O-ring will not engage any contaminating surface.

Another advantage of the present invention is that in the event of a primary O-ring failure, means are provided for immediate shutdown, containment of the hazardous fluid, reportability that the event has occurred, and consequently the protection of the environment and personnel against exposure to the fluids.

These and other objects and advantages of the present invention will no doubt become apparent to those of ordinary skill in the art after having read the following detailed description of a preferred embodiment which is illustrated in the several figures in the drawing.

IN THE DRAWING

DETAILED DESCRIPTION OF THE PREFERRED EMBODIMENT

Figure 1:
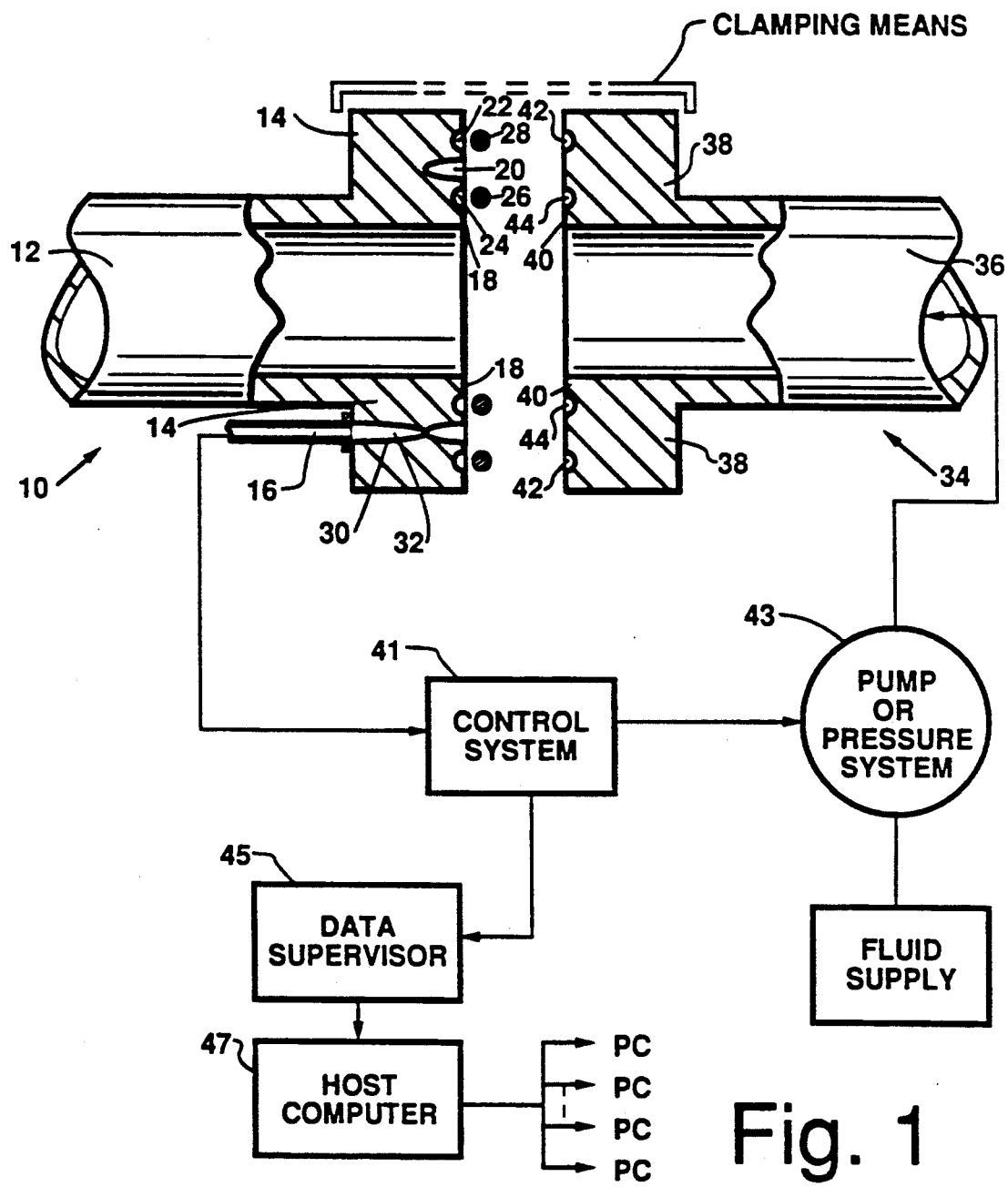
FIG. 1 is a schematic showing of a fluid supply system including an exploded cross section of a generalized fluid conducting junction assembly incorporating a dual O-ring seal, containment chamber and leak detector in accordance with the present invention.

FIG. 1 illustrates generally a fluid supply system and conduit including two mating parts of a leak detecting coupling device such as a union joint or the like in accordance with the present invention. The first part 10 includes a first generally cylindrical conduit 12 having a first flanged end 14 with a leak detector 16 attached thereto. The face 18 of the flanged end 14, which will be adjoined to the second part of the union joint and held in engagement therewith by suitable bolts, clamps, etc., includes an annular containment chamber or collector channel 20 and two annular O-ring grooves 22 and 24. The two O-rings 26 and 28 are shown apart from their respective grooves, and related by dashed correlation lines.

The channel 20 is disposed between the two O-ring grooves and their respective O-rings 26 and 28, and, in the event of a primary O-ring failure, provides a trough or chamber for containment of the escaping fluid. The leak detector 16 is attached to the flange 14 such that the sensor probe 32 is inserted through a hole 30 in the flange 14 and into or closely proximate the channel 20.

Figure 2:
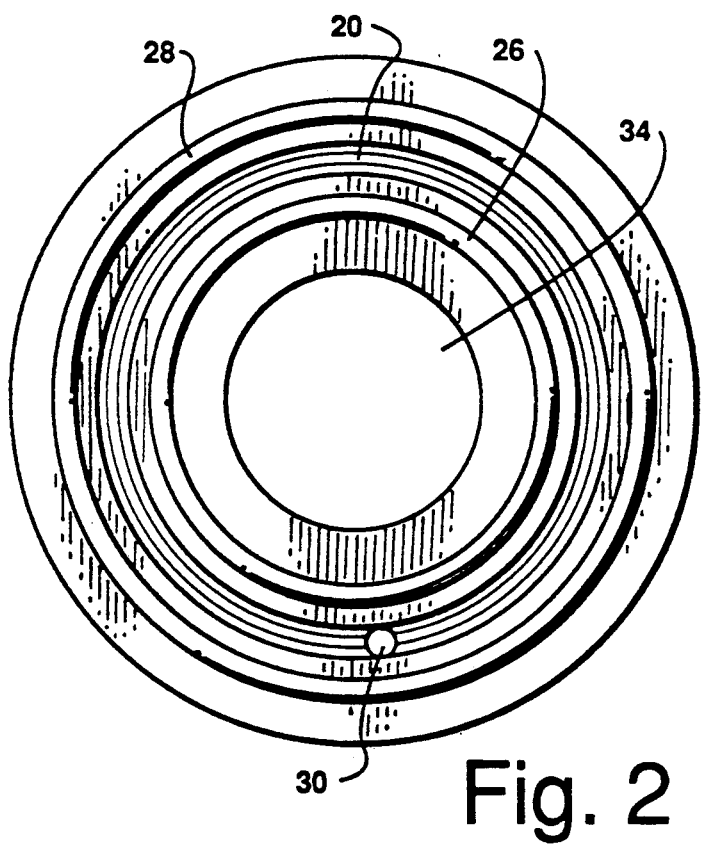
FIG. 2 is an end view of one of the joint members shown in FIG. 1 illustrating the containment channel and dual O-ring configuration.

The face 18 of the first part 10 of the union joint is shown more clearly in FIG. 2 wherein the primary O-ring 26 is shown located closest to the conduit opening through which system fluid will be caused to pass. The collector channel 20 is formed in only the first part of the union joint, and is in communication with the hole 30 or socket that will house the sensor probe 32. The secondary O-ring 28 is disposed outermost from the conduit opening and, in the event of a primary O-ring failure, will prevent fluid from leaking out of the joint into the surrounding atmosphere.

Referring back to FIG. 1, the second part 34 of the union joint is similarly comprised of a generally cylindrical conduit 36 having a second flanged end 38. The face 40 of the flanged end 38 includes two O-ring grooves 42 and 44, disposed so as to mirror the two O-ring grooves 22 and 24 on the first part of the joint.

In an assembled union joint, the two parts are adjoined and aligned by the mating of each O-ring to it's respective groove. The two parts are fastened together by clamping, bolting or other suitable means. In the event of a primary O-ring failure, some of the fluid flowing through the joint will leak into the channel 20. In high priority systems, to prevent contamination of the leaking fluid, all rigid parts forming surfaces contacted or likely to be contacted by the fluid are made of, or are surface coated with, polyfluoroaloxyl, polytetrafluoroethylene or other suitable inert material. The O-rings are preferably made of high priority or encapsulated Teflon compatible with the chemical being transported. For other applications other appropriate types of materials could be used.

The sensor probe 32 preferably comprises an optical device coupled to a fiber optic conductor which leads to an optical detector. The tip of the probe has an index of refraction such that when surrounded by air, exhibits a high level of internal reflection; but when in contact with a liquid, assumes a materially different reflective characteristic. As a consequence, the level of light transmitted to the tip through one or more of the fibers of the conductor and reflected back into other receiving fibers falls below a detection threshold and a leak is signaled Alternatively, some situations may permit suitable resistive, capacitive or other appropriate type of probe to be substituted for the aforementioned optical leak trace probe.

Depending upon the application, probe 32 may extend into channel 20 and perhaps be coated with a thin layer of inert material. In some cases where it is important that no material other than that of the coupling device and O-rings be subject to contact by the transported fluid, it may be necessary that a thin wall be preserved separating the socket 30 and the channel 20. This is appropriate where the material forming the coupling device is translucent. Where the material is not translucent a sealed transparent or translucent plug of an appropriate material may be used to separate probe 32 from the channel 20.

Once the sensor probe 32 detects a leak, it will transmit a signal to a controller 41 which could activate an alarm, shut off the fluid supply line by de-energizing a pump or pressure system 43, or exercise any other preprogrammed response. In one embodiment the control system 41 communicates through a data supervisor 45 to a host computer 47 which in turn provides for communication of the status of the coupling to a plurality of PC's or remote monitors.

Figure 3:
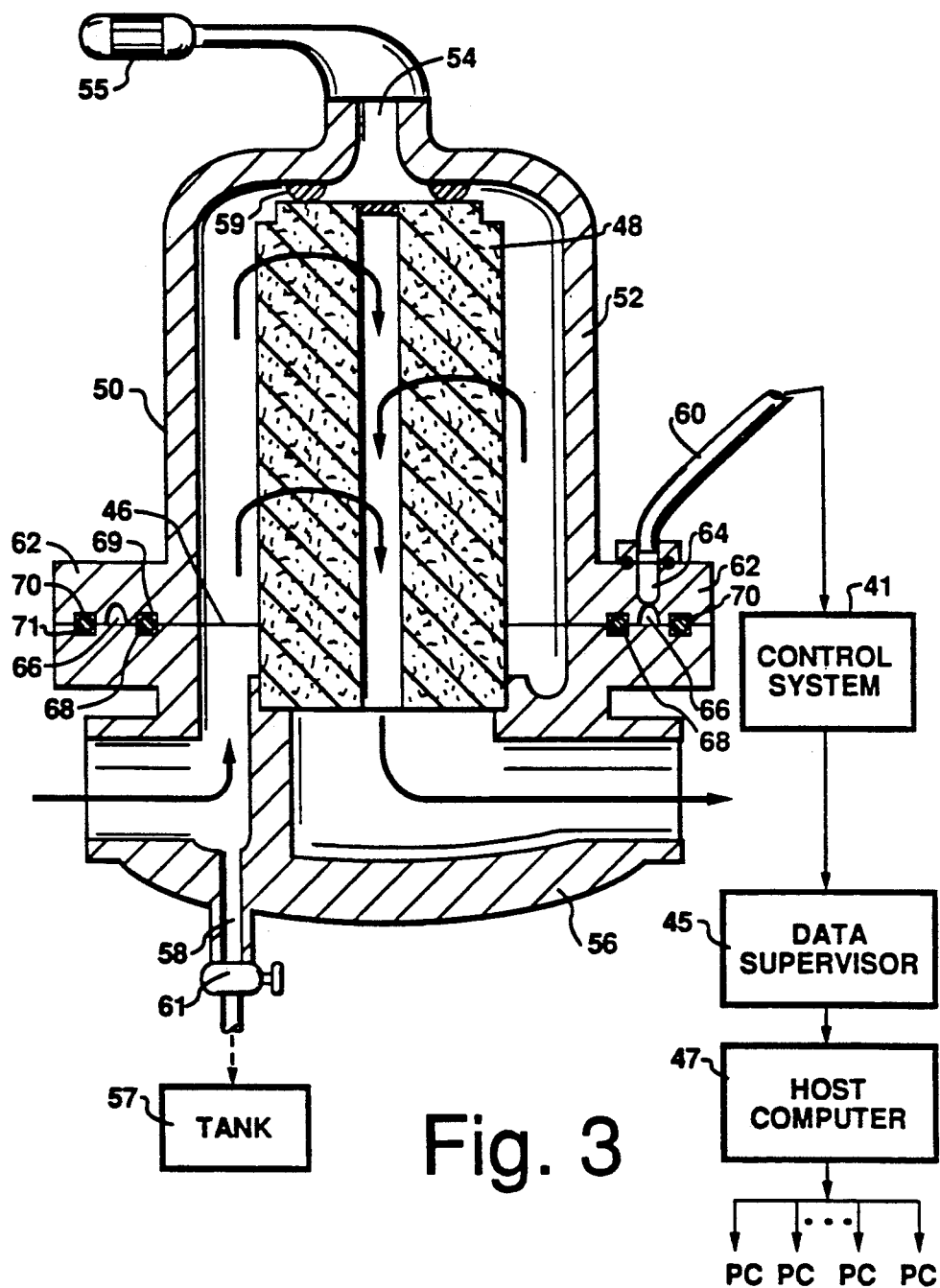
FIG. 3 is a cross section of a fluid filter apparatus including a junction assembly in accordance with the present invention.

FIG. 3 illustrates an alternative embodiment of the present invention incorporated into a system component which requires periodic servicing or inspection. Process fluids will normally be directed through a filter for cleansing prior to being reused. The filter shown is comprised of a filter cartridge 48 encased in a filter housing 50. The filter housing 50 is made up of a filter bowl 52 including a sealed vent 54 and a filter head 56 including a drain 58. The filter bowl 52 can be disassembled from the filter head 56 when the filter cartridge 48 needs servicing or replacement. Although an appropriate reservoir 55 and collection tank 57 can prevent loss of fluid through the seal 59 and valve 61 respectively, leaks can occur at the junction 46 of the filter bowl 52 and filter head 56.

The illustrated filter housing is therefore improved by the addition of a leak detector system in accordance with the present invention. As in the previously described embodiment, a sensor probe 64 is inserted through a hole in the flange 62 into a collector channel 66 formed in the face of the flange 62. The channel 66 lies between two O-rings 68 and 70 that are set into grooves 69 and 71 respectively.

The junction leak detection system incorporated in the filter device operates the same as the dual O-ring and leak detector system of the previously described union joint embodiment. In the case of a failure of the primary O-ring 68, fluid will leak into the channel 66, the sensor probe 60 will detect a change in internal reflection due to the introduction of the liquid into the channel, and a signal will be sent to an alarm or system controller 41.

Although the present invention has been described above in terms of two particular embodiments for use in particular well known devices it will be appreciated that the invention can be incorporated into any fluid handling device in which separable components forming a flow path are included The essence of the invention is that it first provides containment and then detection of a leak through a breached sealing means. It is therefore intended that the following claims be interpreted to cover all application, alterations and modifications that fall within the true spirit and scope of the invention.

What is claimed is:

1. An improved junction assembly for fluid handling systems, comprising:

first and second fluid handling means respectively including means forming first and second planar surfaces surrounding fluid passageways and adapted to face each other and be mated together to couple said first and second handling means together and to join said fluid passageways, at least one of said surfaces having an annular channel formed therein circumscribing the associated passageway and at least one of said surfaces having a first annular groove formed interiorly of said channel and at least one of said surfaces having a second annular groove formed exteriorly of said channel;

means disposed between said first and second surfaces and forming a first seal around the joined passageways, said first seal being disposed in said first groove;

means disposed between said first and second surfaces and forming a second seal around the joined passageways, said second seal being disposed in said second groove; and detector means for detecting the invention of fluid through one of said first and second seals and into said channel, and for generating a signal indicative of said invasion, said detector means including a sensing probe extending at least partially through at least one of said means forming planar surfaces and into sensing communication with said channel.

2. An improved junction assembly as recited in claim 1 wherein said first and second surfaces are the facing surfaces of two flanges respectively affixed to the ends of two conduits to be coupled together.

3. An improved junction assembly as recited in claim 2 wherein said first and second seals are formed by resilient O-rings.

4. An improved junction assembly as recited in claim 1 wherein said sensing probe is an optical device capable of optically detecting the presence of fluid within said channel.

5. An improved junction assembly as recited in claim 1 wherein said first and second surfaces and said first and second seals are made of an inert material.

6. In a fluid handling system including a source of fluid, means forming a fluid passageway, coupling means for joining together various components forming said passageway, pump means for causing fluid from said source to pass through said passageway, and control means responsive to a signal indicating a system leak and operative to de-energize said pump means, an improved coupling means comprising:

first and second fluid handling means respectively including means forming first and second planar surfaces surrounding fluid passageways and adapted to face each other and be mated together to couple said first and second handling means together and to join said fluid passageways, at least one of said surfaces having an annular channel formed therein circumscribing the associated passageway and at least one of said surfaces having a first annular groove formed interiorly of said channel and at least one of said surfaces having a second annular groove formed interiorly of said channel;

means disposed between said first and second surfaces and forming a first seal around the joined passageways, said first seal being disposed in said first groove;

means disposed between said first and second surfaces and forming a second seal around the joined passageways, said second seal being disposed in said second groove; and detector means for detecting the invasion of fluid through one of said first and second seals and into said channel, and for generating a signal indicative of such invasion, whereby the event of a failure of said first seal, said second seal will provide containment and said signal can be used to provide immediate system shutdown and a report that the leak has occurred, said detector means including a sensing probe extending at least partially through at least one of said means forming planar surfaces and into sensing communication with said channel.

7. In a fluid handling system as recited in claim 6 wherein said first and second surfaces are the facing surfaces of two flanges respectively affixed to the ends of two conduits to be coupled together.

8. In a fluid handling system as recited in claim 7 wherein said first and second seals are formed by resilient O-rings.

9. In a fluid handling system as recited in claim 6 wherein said sensing probe is an optical device capable of optically detecting the presence of fluid within said channel.

10. In a fluid handling system as recited in claim 6 wherein said first and second surfaces and said first and second seals are made of an inert material.

* * * * *